US006258451B1

(12) United States Patent
Valentini et al.

(10) Patent No.: US 6,258,451 B1
(45) Date of Patent: Jul. 10, 2001

(54) RECORDING MEDIUM

(75) Inventors: Jose Esteban Valentini, Hendersonville; Jose A Siqueira, Flat Rock; John Thomas Chandler, Brevard; Joseph T Guy, Hendersonville, all of NC (US)

(73) Assignee: AGFA Gevaert N.V., Mortsel (BE)

(*) Notice: Subject to any disclaimer, the term of this patent is extended or adjusted under 35 U.S.C. 154(b) by 0 days.

(21) Appl. No.: 09/197,350

(22) Filed: Nov. 20, 1998

(51) Int. Cl.[7] ........................ B32B 7/02

(52) U.S. Cl. ........................ 428/212; 428/195; 428/341; 428/354

(58) Field of Search ........................ 428/195, 484, 428/474.4, 478.2, 522, 500, 704, 212, 341, 354

(56) References Cited

U.S. PATENT DOCUMENTS

| | | | |
|---|---|---|---|
| 3,889,270 | 6/1975 | Hoffman et al. | 346/1 |
| 4,460,637 | 7/1984 | Miyanato et al. | 425/212 |
| 4,542,059 | 9/1985 | Toyonoh et al. | 346/135.1 |
| 4,592,951 | 6/1986 | Viola | 428/331 |
| 4,636,410 | 1/1987 | Aksyh et al. | 427/261 |
| 4,740,420 | 4/1988 | Akufsu et al. | 428/341 |
| 4,770,934 | 9/1988 | Yamasaki et al. | 428/331 |
| 5,202,205 | 4/1993 | Malhota | 428/331 |
| 5,276,468 | 1/1994 | Deus et al. | 346/140 R |
| 5,302,436 | 4/1994 | Miller | 428/500 |
| 5,397,619 | 3/1995 | Kuroyama et al. | 428/141 |
| 5,418,078 | 5/1995 | Desic et al. | 428/500 |
| 5,753,360 | 5/1998 | Jones | 428/323 |
| 5,756,226 | 5/1998 | Valentini et al. | 428/704 |

FOREIGN PATENT DOCUMENTS

| | | |
|---|---|---|
| 0435675 | 7/1991 | (EP) . |
| 0487349 | 5/1992 | (EP) . |
| 0582466 | 2/1994 | (EP) . |
| 0 634 287 | 1/1995 | (EP) . |
| 2147003 | 5/1985 | (GB) . |
| 62-160287 | 7/1987 | (JP) . |
| 4-364947 | 12/1992 | (JP) . |
| 5-51470 | 3/1993 | (JP) . |
| 6-32046 | 2/1994 | (JP) . |
| 6-93122 | 4/1994 | (JP) . |
| 7-81214 | 3/1995 | (JP) . |

*Primary Examiner*—Bruce H. Hess
*Assistant Examiner*—Michael E Grendzynski
(74) *Attorney, Agent, or Firm*—Hardaway/Mann IP Group; Joseph T. Guy

(57) ABSTRACT

The present invention is directed to a recording medium for recording with a phase change ink. The medium comprises a substrate with a support layer and an adhesive layer coated thereon. The adhesive layer coated on said support layer at a coating weight of no more than 10 $mg/dm^2$, comprises a blooming crosslinker and the adhesive layer is soluble in the phase change ink.

25 Claims, No Drawings

RECORDING MEDIUM

FIELD OF INVENTION

This invention is related to an improved recording medium. More specifically, this invention is related to an improved recording medium particularly suitable for use with phase change ink printing.

BACKGROUND OF THE INVENTION

Transparent films displaying information are widely used throughout many different industries and for many applications. Typically, a positive image is formed by placing an ink or pigment onto a transparent plastic sheet. The image is then displayed by projection of transmitted light.

Media which is suitable for phase change ink printing has been described in commonly assigned U.S. Pat. Nos. 5,756,226 and 5,753,360. The media taught therein is superior with regards to adhesion relative to available teachings in the art. Improvements with regard to the clarity and haze of the media is still desired.

SUMMARY OF THE INVENTION

It is an object of the present invention to provide an improved recording medium.

It is a further object of the present invention to provide a recording medium which is particularly advantageous when used with phase change ink printing methods.

A particular advantage of the present invention is the improved adhesion achieved by the inventive media which is also achieved with improved clarity without scuffing marks.

Yet another particular advantage of the present invention is the clarity which is observed in the media when printed with clear ink.

These and other advantages are provided in a recording medium for recording with a phase change ink comprising a substrate. A support layer is coated on the substrate at a coating weight of at least 0.5 mg/dm$^2$ to no more than 10 mg/dm$^2$. The support layer comprises a binder and an optional blooming crosslinker. Coated on the support layer is an adhesive layer at a coating weight of no more than 10 mg/dm$^2$. The adhesive layer comprises a blooming crosslinker and the adhesive layer is soluble in the phase change ink.

A preferred embodiment is provided in a recording medium for recording with a phase change ink comprising a substrate. Coated on the substrate is a support layer at a coating weight of at least 0.5 mg/dm$^2$ to no more than 10 mg/dm$^2$. The support layer preferably comprises a blooming crosslinker and a binder with the binder comprising at least one compound chosen from a group consisting of polyvinyl alcohol, polyacrylamide, polyvinyl pyrrolidone, polyurethane and gelatin Coated on the support layer is an adhesive layer at a coating weight of no more than 10 mg/dm$^2$. The adhesive layer comprises a second blooming crosslinker, and a low molecular weight polymer that leads to a wax soluble network.

A preferred use of the present invention is provided in a method for forming an image on a recording medium. The method comprises the steps of:

a) transporting the recording medium through a printing region;

b) applying a molten phase change ink in an image wise pattern to the recording medium in the printing region; and c) cooling the molten phase change ink to form a solidified phase change ink in the imagewise pattern on the recording medium.

The recording medium comprises a substrate with a support and an adhesive layer coated thereon. The support layer comprises a binder and a first blooming crosslinker and the adhesive layer comprises a second blooming crosslinker. The adhesive layer is also soluble in the phase change ink.

DETAILED DESCRIPTION OF THE INVENTION

The inventive media comprises a substrate, an optional subbing layer, a support layer coated thereon, an adhesive layer coated on the support layer, and a blooming crosslinker interconnecting the support layer and the adhesive layer.

The support layer comprises a binder. The binder preferably comprises at least one compound chosen from a group consisting of polyvinyl alcohol, polyacrylamide, methyl cellulose, polyvinyl pyrrolidone, gelatin, polyurethane and acrylates. The binder more preferably comprises at least one element chosen from a group consisting of polyvinyl alcohol, polyacrylamide and polyvinyl pyrrolidone. The most preferred binder is polyvinylalcohol with a degree of hydrolysis between 70 and 100%.

The coating weight of the support layer is preferably at least 0.5 mg/dm$^2$ and no more than 10.0 mg/dm$^2$. It is more preferred that the coating weight of the support layer be at least 1 mg/dm$^2$ and no more than 5 mg/dm$^2$. A coating weight of the support layer of at least 2 mg/dm$^2$ and no more than 4 mg/dm$^2$ is most preferred.

The adhesive layer comprises a blooming crosslinker and optionally a low molecular weight polymer that leads to a wax soluble network when crosslinked with the blooming crosslinker. Preferably, the adhesive layer comprises a light activated blooming crosslinker. Most preferred of the light activated blooming crosslinkers are glycerol alkylene oxide-cynnamate and glycerol alkoxylate triacrylate.

The amount of blooming crosslinker in the adhesive layer is preferably at least 1.0 mole % based on the total weight of the blooming crosslinker and binder. The blooming crosslinker in the adhesive layer is preferably at least 20 mole % of the total weight of blooming crosslinker and binder. More preferred, the blooming crosslinker in the support layer is at least 50 mole % based on the total weight of the blooming crosslinker and binder. Most preferred, the blooming crosslinker in the adhesive layer is at least 80 mole % based on the total weight of the blooming crosslinker and binder.

Preferred waxes comprise esters of aliphatic alcohols of at least 10 carbons and aliphatic acids of at least 10 carbons with preferred waxes having a melting temperature of at least 37° C. and boiling temperatures of no more than 100° C.

The low molecular weight polymer that leads to a wax soluble network when crosslinked with the blooming crosslinker is defined by the interaction with the phase change ink and is sufficient to solubilize the phase change ink.

Particularly preferred is an adhesive layer comprising a low molecular weight polymer defined by Formula 1.

Formula 1

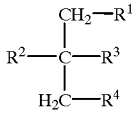

In Formula 1, $R^1$, $R^2$, $R^3$ and $R^4$ are a hydrogen, an alkyl of 1–5 carbons, a subsituted alkyl of 1–5 carbons, an aryl of 6, 10 or 14 carbons or a substitued aryl of 6, 10, or 14 carbons with the proviso that at least two of $R^1$, $R^2$, $R^3$ and $R^4$ are independently chosen from the groups consisting of $-(OCH_2CH_2)_aH$; $-(OCH_2CH_2CH_2)_bH$; $-(OCHCH_3CH_2)_cH$; $-(OCH_2CH_2)_d(OCH_2CH_2CH_2)_eH$; $-(OCH_2CH_2)_f(OCHCH_3CH_2)_gH$; $-OCO(CH_2)_hCH_3$; and $-O(CH_2)_jCH_3$.

The subsripts a, b, c, d, e, f, and g independently represent the integers 1–40. More preferably, a, b, c, d, e, f, and g independently represent the integers 1–20. Most preferably, a, b, c, d, e, f, and g independently represent the integers 1–5. h and j independently represent the integers 1–20. Preferably, h and j independently represent the integers 10–20. More preferably, h and j represent the integers 14–18.

Particularly preferred low molecular weight polymers are:

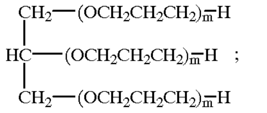

$m$ = 1–20

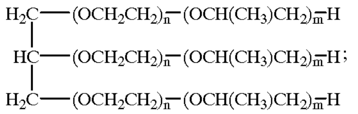

$m$ = 1–20; $n$ = 0–20

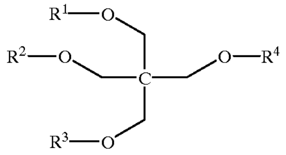

$R^1$, $R^2$, $R^3$, $R^4$ Independently represent $H(OCH_2CH_2)_n$ or $H(OCHCH_3CH_2)_n$ where ; $n$ is 1–40 and

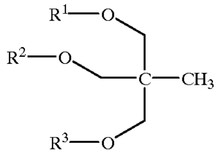

$R^1$, $R^2$, $R^3$ Independently represent $H(OCH_2CH_2)_n$ or $H(OCHCH_3CH_2)_n$ where $n$ is 1–40.

In the present invention the solubility of the phase change ink in the matrix is defined by the steps of a) placing a sample of material comprising the same composition as the support layer in an aluminum dish and placing the dish in an 80° C. oven until dry; b) pouring a solution comprising the adhesive layer over the dried support layer and returning the sample to the 80° C. oven until dry; c) placing small pieces of the phase change ink on the adhesive layer and placing the sample in an oven at 98° C. until the ink melts to form a uniform layer of ink on top of the active layer; and d) after allowing the sample to cool to ambient temperature a cross-section microtome of the composite is observed in an electron microscope at a magnification of 0.5 Kx–1.5 Kx. If the phase change ink is soluble in the adhesive layer the boundaries between ink layers and the adhesive layer is not observed but instead a gradiant region is observed. If the phase change ink is not soluble the layers of phase change ink and adhesive layer are disjoined and the interface is distinguishable.

The coating weight of the adhesive layer is preferably at least 0.5 mg/dm$^2$ and no more than 10.0 mg/dm$^2$. It is more preferred that the coating weight of the adhesive layer be at least 1 mg/dm$^2$ and no more than 8 mg/dm$^2$. A coating weight of the adhesive layer of at least 5 mg/dm$^2$ and no more than 7 mg/dm$^2$ is most preferred.

The blooming crosslinker is a chemical substituent which reacts with the binder of one layer to form a linkage and a portion of which blooms or migrates to a second layer to form an additional linkage. Suitable blooming crosslinkers include those that are activated by heat, light or chemically.

Blooming crosslinkers include peptide couplers, aziridenes and epoxides.

Peptide couplers, also referred to as carboxyl activating agents, suitable for use in the teachings herein are legion in number. Exemplary examples are taught in U.S. Pat. No. 4,942,068 and include but are not limited to

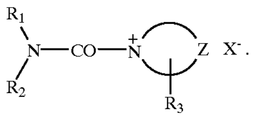

(a)

In Formula (a): $R_1$ represents alkyl, aryl or arylakyl.

$R_2$ has the same meaning as $R_1$ or represents an alkylene, arylene, aralkylene or alkaralkylene with the second bond being attached to the group corresponding to the following formula

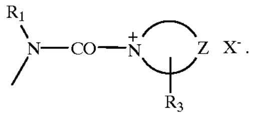

$R_1$ and $R_2$ may also be taken together to represent the atoms required to complete an optionally substituted heterocyclic ring. Exemplary examples include piperidine, piperazine or morpholine rings optionally substituted, for example, by $C_1$–$C_3$ alkyl or halogen.

$R_3$ represents hydrogen, alkyl, aryl, alkoxy, $-NR_4-COR_5$, $-(CH_2)_m-NR_8R_9$, $-(CH_2)_n-CONR_{13}R_{14}$ or

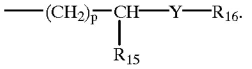

$R_3$ may also represent a bridge member or a direct bond to a polymer chain.

$R_4$, $R_6$, $R_7$, $R_9$, $R_{14}$, $R_{15}$, $R_{17}$, $R_{18}$ and $R_{19}$ represent hydrogen or $C_1$–$C_4$ alkyl.

$R_5$ represents hydrogen, $C_1$–$C_4$ alkyl or $NR_6R_7$.

$R_8$ represents $COR_{10}$.

$R_{10}$ represents $NR_{11}R_{12}$.

$R_{11}$ represents $C_1$–$C_4$ alkyl or aryl, more preferably phenyl.

$R_{12}$ represents hydrogen, $C_1$–$C_4$ alkyl or aryl, more preferably phenyl.

$R_{13}$ represents hydrogen, $C_1$–$C_4$ alkyl or aryl, more preferably phenyl.

$R_{16}$ represents hydrogen, $C_1$–$C_4$ alkyl, $COR_{18}$ or $CONHR_{19}$.

m is 1 to 3.

n is 0 to 3.

p is 2 to 3.

Y represents O or $NR_{17}$.

$R_{13}$ and $R_{14}$ may be taken together to represent the atoms required to complete a substituted or unsubstituted heterocyclic ring. Exemplary examples include piperidine, piperazine or morpholine ring, the rings optionally substituted, for example, by $C_1$–$C_3$ alkyl or halogen.

Z represents the carbon atoms required to complete a 5-membered or 6-membered aromatic heterocyclic ring optionally with a linked benzene ring.

$X^-$ is an anion which is dropped if an anionic group is already attached to the remainder of the molecule.

(b)

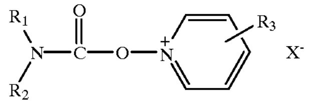

In formula (b) $R_1$, $R_2$, $R_3$ and $X^-$ have the same meaning as defined for formula (a).

(c)

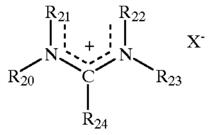

In Formula (c) $R_{20}$, $R_{21}$, $R_{22}$, $R_{23}$ represent $C_1$–$C_{20}$ alkyl, $C_6$–$C_{20}$ aralkyl, $C_5$–$C_{20}$ aryl, either unsubstituted or substituted by halogen, sulfo, $C_1$–$C_{20}$ alkoxy, N,N-di-$C_1$–$C_4$-alkyl-substituted carbamoyl and, in the case of aralkyl and aryl, by $C_1$–$C_{20}$ alkyl.

$R_{24}$ is a group releasable by a nucleophilic agent.

$X^-$ has the same meaning defined for formula (a).

In Formula (c) 2 or 4 of the substituents $R_{20}$, $R_{21}$, $R_{22}$ and $R_{23}$ may be combined together with a nitrogen atom or the group

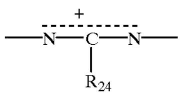

with the optional inclusion of further heteroatoms, such as O or N, to form one or two saturated 5–7-membered rings.

$R_{25}$—N=C=N—$R_{26}$ (d)

In Formula (d) $R_{25}$ represents $C_1$–$C_{10}$ alkyl, $C_5$–$C_8$ cycloalkyl, $C_3$–$C_{10}$ alkoxyalkyl or $C_7$–$C_{15}$ aralkyl.

$R_{26}$ has the same meaning as $R_{25}$ or represents a group corresponding to the following formula:

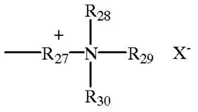

where $R_{27}$ is $C_2$–$C_4$ alkylene.

$R_{28}$, $R_{29}$ and $R_{30}$ represent $C_1$–$C_6$ alkyl or one of the groups $R_{28}$, $R_{29}$ and $R_{30}$ may be substituted by a carbamoyl group or a sulfo group and two of the groups $R_{28}$, $R_{29}$ and $R_{30}$ may even be attached, together with the nitrogen atom, to form an optionally substituted heterocyclic ring. Examples include, for example, pyrrolidine, piperazine or morpholine ring which may be substituted, for example, by $C_1$–$C_3$ alkyl or halogen.

$X^-$ has the same meaning as defined for formula (a).

(e)

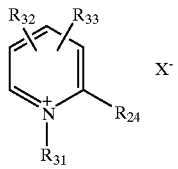

In Formula (e) $X^-$ has the same meaning as defined for formula (a).

$R_{24}$ has the same meaning as defined for formula (c).

$R_{31}$ represents $C_1$–$C_{10}$ alkyl, $C_6$–$C_{15}$ aryl or $C_7$–$C_{15}$ aralkyl, either substituted or unsubstituted by carbamoyl, sulfamoyl or sulfo.

$R_{32}$ and $R_{33}$ represent hydrogen, halogen, acylamino, nitro, carbamoyl, ureido, alkoxy, alkyl, alkenyl, aryl or aralkyl or together the remaining members of a ring, more especially a benzene ring, fused to the pyridinium ring.

$R_{24}$ and $R_{31}$ may be attached to one another where $R_{24}$ is a sulfonyloxy group.

(f)

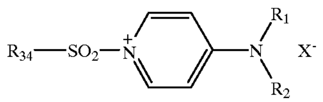

In Formula (f) $R_1$, $R_2$ and $X^-$ have the same meaning as defined for formula (a).

$R_{34}$ represents $C_1$–$C_{10}$ alkyl, $C_6$–$C_{14}$ aryl or $C_7$–$C_{15}$ aralkyl.

(g)

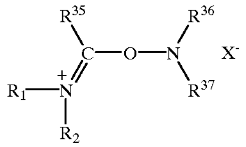

In Formula (g) $R_1$, $R_2$ and $X^-$ have the same meaning as defined for formula (a).

$R_{35}$ represents hydrogen, alkyl, aralkyl, aryl, alkenyl, $R_{38}O$—, $R_{39}R_{40}N$—, $R_{41}R_{42}C$=N— or $R_{38}S$—.

$R_{36}$ and $R_{37}$ represent alkyl, aralkyl, aryl, alkenyl, $R_{43}$—C(O)—, $R_{44}$—$SO_2$ or $R_{45}$—N=N—. Taken together with the nitrogen atom, $R_{36}$ and $R_{37}$ may also represent the remaining members of a heterocyclic ring or the group

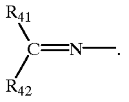

$R_{38}$, $R_{39}$, $R_{40}$, $R_{41}$, $R_{42}$, $R_{43}$, $R_{44}$ and $R_{45}$ represent alkyl, aralkyl, alkenyl, in addition to which $R_{41}$ and $R_{42}$ may represent hydrogen. $R_{39}$ and $R_{40}$ or $R_{41}$ and $R_{42}$ may be taken together to represent the remaining members of a 5- or 6-membered, saturated carbocyclic or heterocyclic ring.

(h)

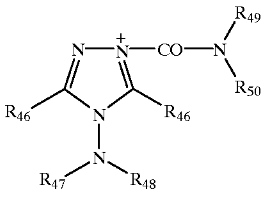

In Formula (h) $R_{46}$ represents hydrogen, alkyl or aryl.

$R_{47}$ represents acyl, carbalkoxy, carbamoyl or aryloxycarbonyl.

$R_{48}$ represents hydrogen or $R_{47}$.

$R_{49}$ and $R_{50}$ represent alkyl, aryl, aralkyl or, together with the nitrogen atom, represent the remaining members of an optionally substituted heterocyclic ring, for example a piperidine, piperazine or morpholine ring, which may be substituted for example by $C_1$–$C_3$ alkyl or halogen.

$X^-$ has the same meaning as defined for formula (a).

A particularly preferred peptide coupler is described in U.S. Pat. No. 5,601,971 the disclosure of which is included herein by reference thereto and includes:

(j)

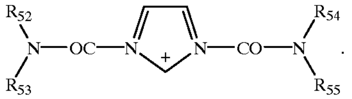

In Formula (j) $R_{52}$, $R_{53}$, $R_{54}$ and $R_{55}$ independently represent a substituted or unsubstituted alkyl of 1–3 carbon atoms, a substituted or unsubstituted aryl group of 6–14 carbons, a substituted or unsubstituted arylalkyl group of 7–20 carbons. $R_{52}$ and $R_{53}$ or $R_{54}$ and $R_{55}$ may be taken together to for a substituted or unsubstituted 5- or 6-membered saturated ring comprising carbon, oxygen, nitrogen or combinations thereof.

$X^-$ is an anion.

The imidazole ring may be substituted with an alkyl group of 1–3 carbon atoms.

Other useful carboxyl activators include, but are not limited to those described in U.S. Pat. No. 5,073,480; U.S. Pat. No. 4,877,724 and those discussed in M. Bodanszky, Principles of Peptide Synthesis, Springer-Verlag, 1984.

Aziridene crosslinking agents are preferably chosen from a group consisting of:

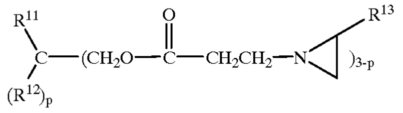

and

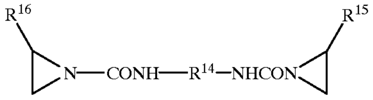

wherein $R^{11}$ and $R^{12}$ independently represent unsubstituted alkyl of 1–6 carbons or alkyl of 1–6 carbons substituted with —OH, or halide. $R^{13}$ represents hydrogen or alkyl of 1 to 6 carbons. p is an integer of 0 or 1. $R^{14}$ is an alkyl of 2 to 6 carbons. $R^{15}$ and $R^{16}$ independently represents hydrogen or alkyl of 1 to 6 carbons.

Preferred epoxide crosslinking compounds are those containing a hydroxyl group or an ether group. Exemplary teachings of epoxide crosslinkers are disclosed in U.S. Pat. No. 5,098,822.

Particularly preferred epoxide crosslinkers are:

HA-1

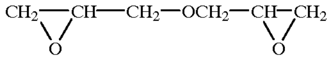

HA-2

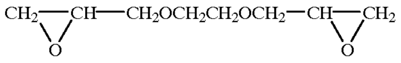

HA-3

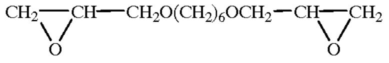

HA-4

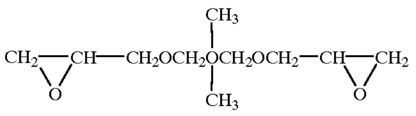

HA-5

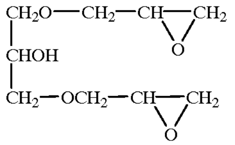

HA-6

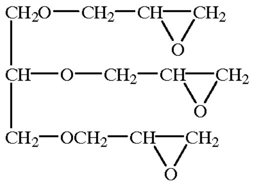

-continued

HA-7

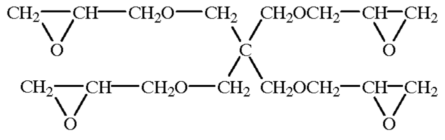

HA-8

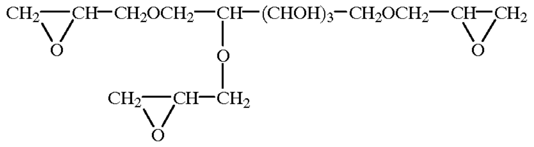

HA-9

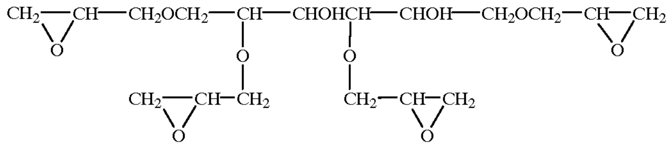

HA-10

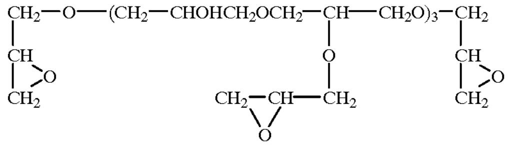

HA-11

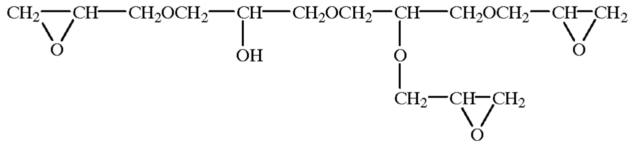

and

HA-12

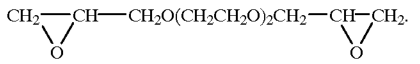

Particularly preferred blooming crosslinkers include glycerol ethers, and polyethylene oxides of the following formula:

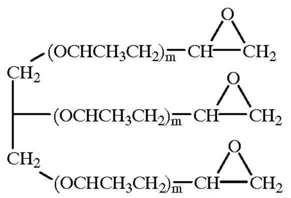

*m* is 1–40

Light activated blooming crosslinkers include alkenes conjugated with a charge delocalizing group such as aryl, pyridinium or carboxyls. Particularly preferred light activated blooming crosslinkers are defined by:

$R^5$—HC═CH—$R^6$ wherein $R^5$ represents aryl, stearyl, lauryl, tridecyl or $COOR^7$;

$R^6$ represents hydrogen, aryl or pyridinium; and $R^7$ represents polymerized alkenes including polyvinylalcohol, polyalkylene oxide and acrylates.

Particularly preferred light activating blooming crosslinkers include:

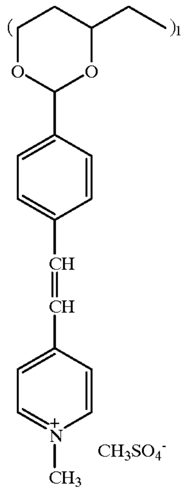

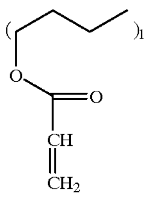

-continued
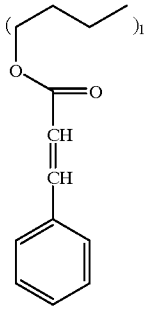
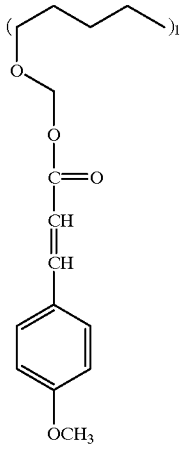
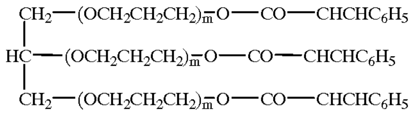
$m = 1–20$
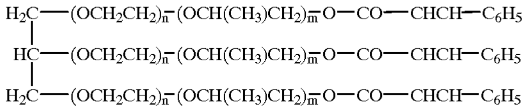
$m = 1–20$; $n = 0–20$
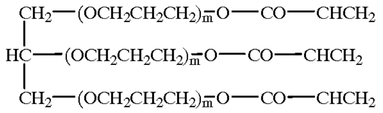
$m = 1–20$
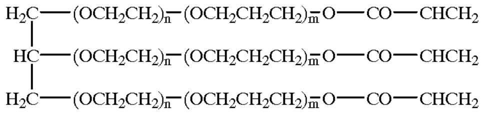
$n, m = 1–20$
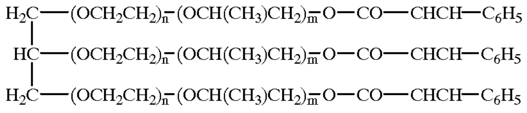
$m = 1–20$; $n = 0–20$
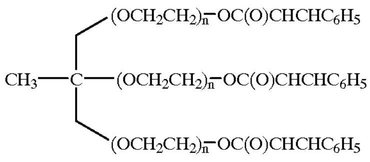
$n$ is 1–40
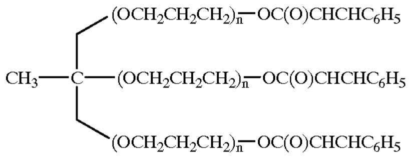
$n$ is 1–40
-continued
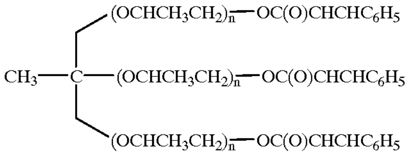
$n$ is 1–40
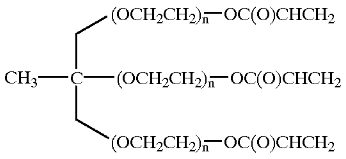
$n$ is 1–40
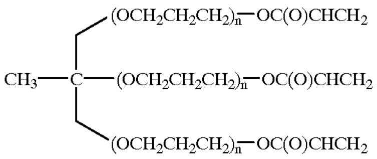
$n$ is 1–40
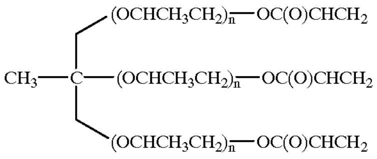
$n$ is 1–40
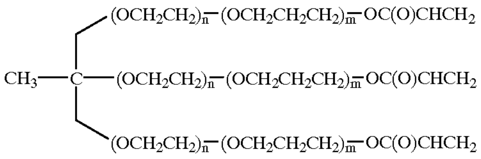
$n$ is 1–40
$m$ is 1–40
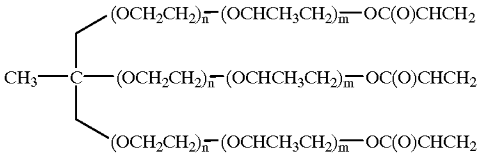
$n$ is 1–40
$m$ is 1–40
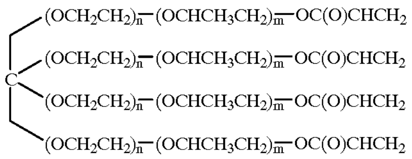
$n$ is 1–40
$m$ is 1–40
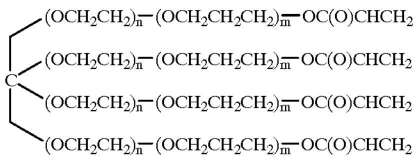
$n$ is 1–40
$m$ is 1–40

-continued

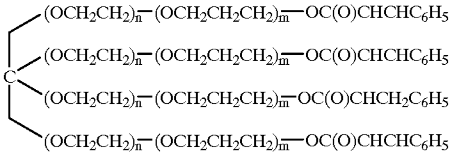

*n* is 1–40
*m* is 1–40

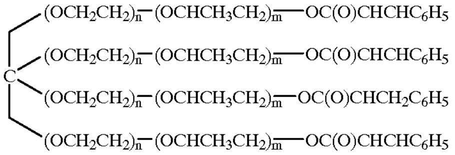

*n* is 1–40
*m* is 1–40

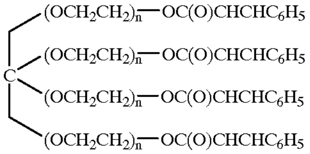

*n* is 1–40

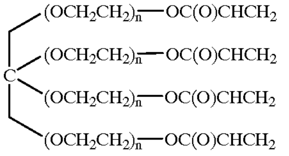

*n* is 1–40

Heat activated blooming crosslinkers include waxes. Preferred waxes include polyethylene oxide waxes. Particularly preferred waxes include poly(ethylene oxide-propylene oxide), propylenediglycidil ethers, and poly (propyleneglycol)diglycidilyethers.

Particularly preferred blooming crosslinkers are isocyanates and glycerol ethers of the following formula:

$$NCO—R^8—NCO$$

where $R^8$ is an alkyl of 2 to 6 carbons or a substituted alkyl of 2–6 carbons.

It is preferred that a blooming crosslinker is added to the support layer. Preferably, the amount of blooming crosslinker in the support layer is at least 2 mole % based on the total weight of the blooming crosslinker and binder. The blooming crosslinker in the support layer is preferably no more than 20 mole % of the total weight of blooming crosslinker and binder. More preferred, the blooming crosslinker in the support layer is at least 2 mole % and no more than 10 mole % based on the total weight of the blooming crosslinker and binder.

The subbing layer comprises a subbing binder and an inorganic particulate material. The subbing binder comprises at least one water soluble polymer. The prefered water soluble polymers are chosen based on low ionic content and the presence of groups capable of adhering to silica. The water soluble polymer is most preferably chosen from polyvinyl alcohol, acrylates, hydrolyzed polyacrylamide, methyl cellulose, polyvinyl pyrrolidone, gelatin and copolymers thereof. Copolymers and grafted polymers are suitable provided they are water soluble or water dispersable and dry to a clear coat. Particularly suitable copolymers comprise acrylic acid/vinyl pyrrolidone copolymers and urethane/acrylate copolymers. More preferably, the subbing binder comprises at least one polymer chosen from a group consisting of polyvinyl alcohol, polyvinyl pyrrolidone and gelatin. Most preferably, the subbing binder comprises polymerized monomer chosen from vinyl alcohol, acrylamide, vinyl pyrrolidone and combinations thereof.

Inorganic particulate material may be added to the support layer in amounts sufficient to increase coatability without deleterious effects. The optional inorganic particulate material is preferably chosen from a group consisting of colloidal silica and alumina. The preferred inorganic particulate material is silica with a hydrodynamic diameter in water of no more than 0.3 $\mu$m. More preferably the inorganic particulate material has a hydrodynamic diameter in water of no more than 0.1 $\mu$m. Also preferred as a particulate material is silica with a hydrodynamic diameter in water of no more than about 0.05 $\mu$m. The silica is preferably at least 0.005 $\mu$m. A hydrodynamic diameter in water between 0.005 $\mu$m and 0.030 $\mu$m with a specific surface area between 100 and 300 $m^2/g$ is particularly advantageous for superior adhesion. More preferred for adhesion is a silica hydrodynamic diameter in water of 0.010 to 0.020 $\mu$m with a surface area of 200 to 300 $m^2/g$. Scratch resistance is most improved with a silica hydrodynamic diameter in water of 0.01 to 0.015 $\mu$m and a specific surface area of 200 to 250 $m^2/g$. Colloidal silica comprising multispherically coupled and/or branched colloidal silica is suitable for use herein. Specific examples are colloidal silica particles having a long chain structure in which spherical colloidal silica is coupled in a multispherical form. Also preferred is a colloidal silica in which the coupled silica is branched. Multispherically coupled colloidal silica is obtained by forming particle-particle bonds between primary particles of spherical silica by interspersing metal ions having a valence of two or more between the spherical silica particles. Preferably, the multispherically coupled colloidal silica has at least three particles coupled together. More preferably the multispherically coupled colloidal silica has at least five particles coupled together and most preferably the multispherically coupled colloidal silica has at least seven particles coupled together. The hydrodynamic diameter in water of the inorganic particulate material is determined as the diameter of a spherical particle with the same hydrodynamic properties as the sample in question. By way of example, a fibrous silica particle with dimensions of approximately 0.150 $\mu$m by 0.014 $\mu$m exhibits a hydrodynamic diameter in water of approximately 0.035 $\mu$m.

The term "gelatin" as used herein refers to the protein substances which are derived from collagen. In the context of the present invention "gelatin" also refers to substantially equivalent substances such as synthetic analogues of gelatin. Generally, gelatin is classified as alkaline gelatin, acidic gelatin or enzymatic gelatin. Alkaline gelatin is obtained from the treatment of collagen with a base such as calcium hydroxide, for example. Acidic gelatin is that which is obtained from the treatment of collagen in acid such as, for example, hydrochloric acid and enzymatic gelatin is generated with a hydrolase treatment of collagen. The teachings of the present invention are not restricted to gelatin type or the molecular weight of the gelatin.

Other materials can be added to the support layer to aid in coating and to alter the rheological properties of either the coating solution or the dried layer. Polymethylmethacrylate beads can be added to assist with transport through phase change ink printers. Care must be taken to insure that the amount of beads is maintained at a low enough level to insure that adhesion of the phase change ink to the substrate is not deteriorated. Preferably, the beads should represent no more than about 1.0% by weight of the receptive layer. It is conventional to add surfactants to a coating solution to improve the coating quality. Surfactants and conventional coating aids are compatible with the present invention.

The preferred substrate is a polyester obtained from the condensation polymerization of a diol and a dicarboxylic acid. Preferred dicarboxylic acids include terephthalate acid, isophthalic acid, phthalic acid, naphthalenedicarboxylic acid, adipic acid and sebacic acid. Preferred diols include ethylene glycol, trimethylene glycol, tetramethylene glycol and cyclohexanedimethanol. Specific polyesters suitable for use in the present invention are polyethylene terephthalate, polyethylene-p-hydroxybenzoate, poly-1,4-cyclohexylene dimethylene terephthalate, and polyethylene-2,6-naphthalenecarboxylate. Polyethylene terephthalate is the most preferred polyester for the substrate due to superior water resistance, excellent chemical resistance and durability. The polyester substrate is preferably 1–10 mil in thickness. More preferably the polyester substrate is 3–8 mil thick and most preferably the polyester substrate is either 3.5–4.5 mil or 6–8 mil thick. The receptive layer may also be applied to cellulose base media such as paper and the like.

A primer layer is preferably included between the support layer and the substrate to provide increased adhesion between the support layer and the substrate. Preferred primer layers are resin layers or antistatic layers. Resin and antistatic primer layers are described, for example, in U.S. Pat. Nos. 3,567,452; 4,916,011; 4,701,403; 4,891,308; and 4,225,665, and 5,554,447.

The primer layer is typically applied and dry-cured during the manufacture of the polyester substrate. When polyethylene terephthalate is manufactured for use as a photographic substrate, the polymer is cast as a film, the mixed polymer primer layer composition is applied to one or both sides and the structure is then biaxially stretched. The biaxial stretching is optionally followed by coating of either a gelatin subbing layer or an antistatic layer. Upon completion of the stretching and the application of the primer layer compositions, it is necessary to remove strain and tension in the substrate by a heat treatment comparable to the annealing of glass. Air temperatures of from 100° C. to 160° C. are typically used for this heat treatment.

It is preferable to activate the surface of the substrate prior to coating to improve the coating quality thereon. The activation can be accomplished by corona-discharge, glow-discharge, UV-rays or flame treatment. Corona-discharge is preferred and can be carried out to apply an energy of 1 mw to 1 $kW/m^2$. More preferred is an energy of 0.1 w to 5 $w/m^2$.

Bactericides may optionally be added to the receptive layer or the primer layer to prevent bacteria growth. Preferred are Kathon®, neomycin sulfate, and others as known in the art.

An optional, but preferred backing layer can be added opposite the inventive layer to decrease curl, impart color, assist in transport, and other properties as common to the art. The backing layer may comprise cross linkers to assist in the formation of a stronger matrix. Preferred cross linkers for the backing layer are carboxyl activating agents as defined in Weatherill, U.S. Pat. No. 5,391,477. Most preferred are imidazolium hardeners as defined in Fodor, et al, U.S. Pat. Nos. 5,459,029; 5,378,842; 5,591,863; and 5,601,971. Aziridine and epoxy crosslinkers are also suitable crosslinkers. The backing layer may also comprise transport beads such as polymethylmethacrylate. It is known in the art to add various surfactants to improve coating quality. Such teachings are relevant to the backing layer of the present invention.

Phase change inks are characterized, in part, by their propensity to remain in a solid phase at ambient temperature and in the liquid phase at elevated temperatures in the printing head. The ink is heated to the liquid phase and droplets of liquid ink are ejected from the printing head. When the ink droplets contact the surface of the printing media they quickly solidify to form a pattern of solid ink drops. This process is known as direct ink jet printing. Other devices deliver the liquid ink droplets to a heated drum, maintained just below the melting temperature of the phase change inks. The patterned ink is then transferred from the drum in the rubbery state to the media under pressure. This process is known as indirect printing.

The phase change ink composition comprises the combination of a phase change ink carrier and a compatible colorant. The thermomechanical properties of the carrier are adjusted according to the mode of printing and further to match the precise parameters of the printer design. Thus each printer design has a matching optimized ink.

Exemplary phase change ink colorants comprise a phase change ink soluble complex of (a) a tertiary alkyl primary amine and (b) dye chromophores having at least one pendant acid functional group in the free acid form. Each of the dye chromophores employed in producing the phase change ink colorants are characterized as follows: (1) the unmodified counterpart dye chromophores employed in the formation of the chemical modified dye chromophores have limited solubility in the phase change ink carrier compositions, (2) the chemically modified dye chromophores have at least one free acid group, and (3) the chemically modified dye chromophores form phase change ink soluble complexes with tertiary alkyl primary amines. For example, the modified phase change ink colorants can be produced from unmodified dye chromophores such as the class of Color Index dyes referred to as Acid and Direct dyes. These unmodified dye chromophores have limited solubility in the phase change ink carrier so that insufficient color is produced from inks made from these carriers. The modified dye chromophore preferably comprises a free acid derivative of an xanthene dye.

The tertiary alkyl primary amine typically includes alkyl groups having a total of 12 to 22 carbon atoms, and preferably from 12 to 14 carbon atoms. The tertiary alkyl primary amines of particular interest are produced by Rohm and Haas, Incorporated of Houston, Texas under the trade names Primene JMT and Primene 81-R. Primene 81-R is the preferred material. The tertiary alkyl primary amine of this invention comprises a composition represented by the structural formula:

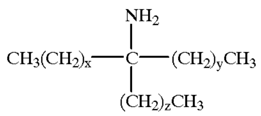

wherein:

x is an integer of from 0 to 18;

y is an integer of from 0 to 18; and z is an integer of from 0 to 18;

with the proviso that the integers x, y and z are chosen according to the relationship:

$$x+y+z=8 \text{ to } 18.$$

Exemplary phase change ink carriers typically comprise a fatty amide containing material. The fatty amide-containing material of the phase change ink carrier composition preferably comprises a tetraamide compound. The preferred tetra-amide compounds for producing the phase change ink carrier composition are dimeric acid-based tetra-amides which preferably include the reaction product of a fatty acid, a diamine such as ethylene diamine and a dimer acid. Fatty acids having from 10 to 22 carbon atoms are preferably employed in the formation of the dimer acid-based tetra-amide. These dimer acid-based tetramides are produced by Union Camp and comprise the reaction product of ethylene diamine, dimer acid, and a fatty acid chosen from decanoic acid, myristic acid, stearic acid and docasanic acid. The preferred dimer acid-based tetraamide is the reaction product of dimer acid, ethylene diamine and stearic acid in a stoichiometric ratio of 1:2:2, respectively. Stearic acid is the preferred fatty acid reactant because its adduct with dimer acid and ethylene diamine has the lowest viscosity of the dimer acid-based tetra-amides.

The fatty amide-containing material can also comprise a mono-amide. In fact, in the preferred case, the phase change ink carrier composition comprises both a tetra-amide compound and a mono-amide compound. The mono-amide compound typically comprises either a primary or secondary mono-amide, but is preferably a secondary mono-amide. Of the primary mono-amides stearamide, such as Kemamide S, manufactured by Witco Chemical Company, can be employed. As for the secondary mono-amides behenyl behemamide and stearyl stearamide are extremely useful mono-amides.

Another way of describing the secondary mono-amide compound is by structural formula. More specifically a suitable secondary mono-amide compound is represented by the structural formula:

$$C_xH_y—CO—NHC_aH_b$$

wherein:

x is an integer from 5 to 21;

y is an integer from 11 to 43;

a is an integer from 6 to 22; and b is an integer from 13 to 45.

The preferred fatty amide-containing materials comprise a plurality of fatty amide materials which are physically compatible with each other. Typically, even when a plurality of fatty amide-containing compounds are employed to produce the phase change ink carrier composition, the carrier composition has a substantially single melting point transition. The melting point of the phase change ink carrier composition is preferably at least about 70° C., more preferably at least 80° C. and most preferably at least 85° C.

The preferred phase change ink carrier composition comprises a tetra-amide and a mono-amide. The weight ratio of the tetra-amide to the mono-amide in the preferred instance is from about 2:1 to 1:10 and more preferably from about 1:1 to 1:3.

Modifiers can be added to the carrier composition to increase the flexibility and adhesion. A preferred modifier is a tackifier. Suitable tackifiers are compatible with fatty amide-containing materials and include, for example, Foral 85, a glycerol ester of hydrogenated abietic acid, and Foral 105, a pentaerythritol ester of hydroabietic acid, both manufactured by Hercules Chemical Company; Nevtac 100 and Nevtac 80. synthetic polyterpene resins manufactured by Neville Chemical Company, Wingtack 86, a modified synthetic polyterpene resin manufactured by Goodyear Chemical Company, and Arakawa KE 311, a rosin ester manufactured by Arakawa Chemical Company.

Plasticizers are optionally, and preferably, added to the phase change ink carrier to increase flexibility and lower melt viscosity. Particularly suitable plasticizers include dioctyl phthalate, diundecyl phthalate, alkylbenzyl phthalate (Santicizer 278) and triphenyl phosphate, all manufactured by Monsanto Chemical Company; tributoxyethyl phosphate (KP-140) manufactured by FMC Corporation; dicyclohexyl phthalate (Morflex 150) manufactured by Morflex Chemical Company Inc.; and trioctyl trimellitate, manufactured by Kodak.

Other materials may be added to the phase change ink carrier composition. In a typical phase change ink chemical composition, antioxidants are added for preventing discoloration of the carrier composition. The preferred antioxidant materials include Irganox 1010 manufactured by Ciba Geigy; and Naugard 76, Naugard 512, and Naugard 524 manufactured by Uniroyal Chemical Company; the most preferred antioxidant being Naugard 524.

A particularly suitable phase change ink carrier composition comprises a tetra-amide and a mono-amide compound, a tackifier, a plasticizer, and a viscosity modifying agent. The preferred compositional ranges of this phase change ink carrier composition are as follows: from about 10 to 50 weight percent of a tetraamide compound, from about 30 to 80 weight percent of a mono-amide compound, from about 0 to 25 weight percent of a tackifier, from about 0 to 25 weight percent of a plasticizer, and from about 0 to 10 weight percent of a viscosity modifying agent.

Preferred phase change inks exhibit a high level of lightness, chroma, and rectilinear light transmissivity when utilized in a thin film of substantially uniform thickness, so that color images can be conveyed using overhead projection techniques. Another preferred property of the ink carrier is the ability to be reoriented into a thin film after printing without cracking or transferring to the rollers typically used for reorientation.

A phase change ink printed substrate is typically produced in a drop-on-demand ink jet printer. The phase change ink is applied to at least one surface of the substrate in the form of a predetermined pattern of solidified drops. Upon impacting the substrate surface, the ink drops, which are essentially spherical in flight, wet the substrate, undergo a liquid-to-solid phase change, and adhere to the substrate. Each drop on the substrate surface is non-uniform in thickness and transmits light in a non-rectilinear path.

The pattern of solidified phase change ink drops can, however, be reoriented to produce a light-transmissive phase change ink film on the substrate which has a high degree of lightness and chroma, when measured with a transmission spectrophotometer, and which transmits light in a substantially rectilinear path. The reorientation step involves the controlled formation of a phase change ink layer of a substantially uniform thickness. After reorientation, the layer of light-transmissive ink will transmit light in a substantially rectilinear path. If the substrate on which the ink is applied is also light transmissive, a projected image having clearly visible intense colors can be formed when a beam of light is projected through the reoriented printed substrate.

The coating weight is measured gravimetrically. The sample is cut into a 10 cm×10 cm square and weighed on a calibrated analytical balance to the nearest 0.1 mgm. The cut sample is then immersed into acetone, or another suitable solvent, to soften and lift the coating as a free membrane. Any strongly adhered coating is removed with an acetone soaked wipe. The sample is then dried and reweighed to calculate the coating weight in mgm/sqdm by difference.

Total haze of the coated media, clarity and transmission was measured with a Gardner Haze-gard Plus System calibrated with clarity and zero calibration standards.

The following examples illustrate the invention and are not intended to limit the scope of the invention.

COMPARATIVE EXAMPLE 1

Coating solutions were prepared comprising approximately 11.6%, by weight, polyvinylalcohol, approximately 85.4%, by weight styrene acrylate copolymer and approximately 3%, by weight, silica. The polyvinylalcohol is available as Elvanol 90–50 from E. I. duPont de Nemours, of Wilmington, Del. The sytrene-acrylate copolymer dispersion is available under the trade name Glascol RP6, available from Allied Colloids, Inc., 2301 Wilroy Road, Suffolk, Va. 23439. The silica is available as Snowtex-UP from Nissan Chemical Industry, Ltd. of New York, N.Y.

The coating solution was coated using a slide coater with variation of the solution analysis, coating speed, to vary the coating thickness to obtain a coating weight of approximately 40 mg/dm$^2$. The films were dried after coating using a floater dryer at a controlled drying rate which provided a substrate temperature of 25–29° C. at the dry point.

COMPARATIVE EXAMPLE 2

Coating solutions were prepared comprising approximately 12%, by weight, polyvinyl alcohol, and 88%, by weight, silica. The polyvinyl alcohol is available is Elvanol 90–50 from E. I. du Pont de Nemours, of Wilmington, Del. The silica is available as Snowtex-OUP from Nissan Chemical Industry, Ltd. of New York, N.Y.

The coating solution was coated using an air/knife coater with variations of the air knife pressure, coating speed and solution viscosity to obtain a coating weight of approximately 9 mg/dm$^2$. The films were dried after coating using a floater dryer at a substrate temperatre of approximately 25–29° C.

COMPARATIVE EXAMPLE 3

Coating solutions for the bottom layer were prepared comprising approximately 12%, by weight, polyvinyl alcohol and 88%, by weight, silica. The polyvinyl alcohol is available is Elvanol 90–50 from E. I. du Pont de Nemours, of Wilmington, Del. The silica is available as Snowtex-OUP from Nissan Chemical Industry, Ltd. of New York, NY.

Coating solutions for the top layer were prepared comprising approximately 35%, by weight, polyvinylalcohol; 50%, by weight, silica and 15%, by weight, sodium acrylate polymer. The polyvinyl alcohol is available as Elvanol 90–50 from E. I. du Pont de Nemours, of Wilmington, Del. The silica is available as Snowtex-OUP from Nissan Chemical Industry, Ltd. of New York, N.Y. and the sodium acrylate is available form Allied Colloids of Suffolk, Va.

Both layers were coated using an air/knife coater with variations of the air knife pressure, coating speed and solution viscosity to obtain a coating weight of approximately 9 mg/dm$^2$ for the bottom layer and 2–5 mg/dm$^2$ for the top layer. After coating, the layers were dried using a floater dyer at a substrate temperature of approximately 25–29° C.

INVENTIVE EXAMPLE 1

An inventive sample was prepared comprising a polyethylene terephthalate support with a 2 mg/dm$^2$ subbing layer comprising approximately 88%, by weight polyvinyl alcohol and approximately 12%, by weight silica. A support layer comprising approximately 96%, by weight, PVA/N-methyl-4-(p-formyl-styryl) pyridinium methosulfate and approximately 4%, by weight, silica beads was coated on the subbing layer. The coating weight of the support layer was approximately 4 mg/dm$^2$. An adhesive layer comprising approximately 98%, by weight, glycerol propylene oxide-cynnamate and approximately 2%, by weight, polymethylmethacrylate beads was coated on the support layer. The coated sample was exposed to a 320 nm UV light at an intensity of approximately 100 mJ/cm2 for ~2 minutes.

INVENTIVE EXAMPLE 2

An inventive sample was prepared as described for Inventive Example 1 with the exception of the adhesive layer which comprised approximately 88%, by weight, glycerol propoxylate triacrylate, approximately 10%, by weight, benzophenone and approximately 2%, by weight polymethylmethacrylate beads.

INVENTIVE EXAMPLE 3

An inventive sample was prepared as described for Inventive Example 1 with the exception of the adhesive layer which comprised approximately 88%, by weight, glycerol propoxylate/ethoxylate triacrylate, approximately 10%, by weight, benzophenone and approximately 2%, by weight polymethylmethacrylate beads.

INVENTIVE EXAMPLE 4

An inventive sample was prepared as described for Inventive Example 1 with the exception of the adhesive layer which comprised approximately 88%, by weight, glycerol ethyleneoxide/propylene oxide, approximately 10%, by weight, benzophenone and approximately 2%, by weight polymethylmethacrylate beads.

The comparative and inventive samples were printed with a Phaser 340 available from Tektronix, Inc. The haze, and clarity of the printed media were determined for each sample and the results are included in Table 1. The haze and clarity of the unprinted media, tape test, and durability are included in Table 2.

INVENTIVE EXAMPLE 5

A support layer was coated on a polyethylene terephthalate sheet at a coating weight of 4 mg/dm$^2$. The support layer comprised approximately 96%, by weight, polyvinylalcohol/N-methyl-4-(p-formyl-styryl) pyridinium methosulfate and approximately 4%, by weight silica beads. An adhesive layer was coated on the support layer at a coating weight of approximately 4 mg/dm$^2$. The adhesive layer comprised approximately 38%, by weight, polyvinylalcohol/N-methyl-4-(p-formyl-styryl) pyridinium methosulfate; approximately 60%, by weight, poly(ethylene oxide-propylene oxide) in a ratio of 3:1; and approximately 2%, by weight, polymethacrylate beads. The sample was exposed to 320 nm UV light at an intensity of 100 mJ/cm$^2$ for approximately 1 second.

INVENTIVE EXAMPLE 6

A support layer was coated on a polyethylene terephthalate sheet at a coating weight of approximately 4 mg/dm$^2$. The support layer comprised approximately 96%, by weight, polyvinylalcohol/N-methyl-4-(p-formyl-styryl) pyridinium methosulfate and approximately 4%, by weight silica beads. An adhesive layer was coated on the support layer at a coating weight of approximately 4 mg/dm$^2$. The adhesive layer comprised approximately 50%, by weight, propylene oxide glycidyl ether; approximately 38%, by weight, hexamethyldiisocyanate; and approximately 2%, by weight, polymethylacrylate beads. The sample was allowed to react prior to testing.

TABLE 1

| Sample | Printed Haze | Printed Clarity | CW |
|---|---|---|---|
| Comparative 1 | 70.4 | 39.6 | 40 |
| Inventive 1 | 25 | 76 | <10 |
| Inventive 2 | 21 | 78 | <10 |
| Inventive 3 | 22 | 75 | <10 |
| Inventive 4 | 27 | 75 | <10 |
| Inventive 5 | 23 | 78 | <10 |
| Inventive 6 | 21 | 77 | <10 |

The results in Table 1 clearly illustrate the improvements in Haze and Clarity obtained with printed media and the coating weight reduction which can be obtained.

TABLE 2

| Sample | UnPrinted Haze | Unprinted Clarity | Tape Test | Durability |
|---|---|---|---|---|
| Comparative 2 | 7.98 | 93.4 | 0.8 | 0–1 |
| Comparative 3 | 1.66 | 98.6 | 0.9 | 0–1 |
| Inventive 1 | 2.77 | 96.2 | 3–4 | 3–4 |
| Inventive 2 | 1.5 | 97.3 | 3–4 | 3–4 |
| Inventive 3 | 1.8 | 98.5 | 3–4 | 3–4 |
| Inventive 4 | 1.8 | 96.5 | 3–4 | 3–4 |
| Inventive 5 | 1.9 | 97.0 | 2–3 | 2–3 |
| Inventive 6 | 1.7 | 96.2 | 1–2 | 2–3 |

The results in Table 2 clearly illustrate the improved Haze and Clarity of the unprinted media and the improved tape test and durability obtained when a solid ink is applied.

The invention has been described an illustrated with particular emphasis on solid ink jet imaging. It would be clear to a skilled artisan that the media formulation described and claimed herein is suitable for a wide variety of printing techniques including electrostatic printers, solvent based inks, etc. It would be readily apparant to one skilled in the art that modifications from the preferred embodiments described herein could be made without departing from the spirit or scope of the invention as set forth in the accompanying claims.

Claimed is:

1. A recording medium for recording with a phase change ink comprising:

a substrate;

a support layer coated on said substrate at a coating weight of from at least 0.5 mg/$dm^2$ to no more than 10 mg/$dm^2$ comprising a binder and at least 2 mole % of a second blooming cross-linker, based upon the total weight of said second blooming cross-linker and said binder; and an adhesive layer coated on Said support layer at a coating weight of no more than 10 mg/$dm^2$ comprising a binder and a first blooming cross-linker which cross-links the support layer to the adhesive layer, wherein the adhesive layer is soluble in the phase change ink.

2. The recording medium of claim 1 wherein said binder comprises at least one compound chosen from a group consisting of polyvinyl alcohol, polyacrylamide, methyl cellulose, polyvinyl pyrrolidone, gelatin, polyurethane and acrylate.

3. The recording medium of claim 2 wherein said binder comprises at least one compound chosen from a group consisting of polyvinyl alcohol, polyacrylamide, polyvinyl pyrrolidone, polyurethane and gelatin.

4. The recording medium of claim 3 wherein said binder is polyvinylalcohol with a degree of hydrolysis between 70 and 100%.

5. The recording medium of claim 1 wherein said support layer comprises no more than 20 mole % of said second blooming crosslinker based on the total weight of said second blooming crosslinker and said binder.

6. The recording medium of claim 5 wherein said support layer comprises at least 2 mole % and no more than 10 mole % of said second blooming crosslinker based on the total weight of said second blooming crosslinker and said binder.

7. The recording medium of claim 1 wherein said support layer is coated at a coating weight of at least 1 mg/$dm^2$ and no more than 5 mg/$dm^2$.

8. The recording medium of claim 1 wherein said first blooming crosslinker represents at least 1 mole % of said adhesive layer.

9. The recording medium of claim 8 wherein said first blooming crosslinker represents at least 20 mole % of said adhesive layer.

10. The recording medium of claim 9 wherein said first blooming crosslinker represents at least 80 mole % of said adhesive layer.

11. The recording medium of claim 1 wherein the binder of the adhesive layer comprises a low molecular weight polymer that leads to a wax soluble network.

12. A recording medium for recording with a phase change ink comprising:

a substrate;

a support layer coated on said substrate at a coating weight of at least 0.5 mg/dm2 to no more that 10 mg/dm2 wherein said support layer comprises a binder;

an adhesive layer coated on said support layer at a coating weight of no more than 10 mg/dm2; and a first blooming crosslinker crosslinking said support layer to said adhesive layer and said adhesive layer is soluble in said phase change ink wherein said adhesive layer further comprises a low molecular weight polymer that leads to a wax soluble network and wherein said low molecular weight polymer comprises at least one compound chosen from the group consisting of ester of aliphatic alcohols comprising at least 10 carbons and aliphatic acids comprising at least 10 carbons.

13. A recording medium for recording with a phase change ink comprising:

a substrate;

a support layer coated on said substrate at a coating weight of at least 0.5 mg/dm2 to no more than 10 mg/dm2 wherein said support layer comprises a binder;

an adhesive layer coated on said support layer at a coating weight of no more than 10 mg/dm2; and a first blooming crosslinker crosslinking said support layer to said adhesive layer and said adhesive layer is soluble in said phase change ink wherein said adhesive layer further comprises a low molecular weight polymer that leads to a wax soluble network and wherein said low molecular weight polymer wherein said wax has a melting point of at least 37° C. and a boiling temperature of at least 100° C.

14. A recording medium for recording with a phase change ink comprising:

a substrate;

a support layer coated on said substrate at a coating weight of at least 0.5 mg/$dm^2$ to no more than 10 mg/$dm^2$ wherein said support layer comprises a binder;

an adhesive layer coated on said support layer at a coating weight of no more than 10 mg/$dm^2$ wherein said adhesive layer comprises a first blooming crosslinker and said adhesive layer is soluble in said phase change ink wherein said adhesive layer further comprises a low molecular weight polymer that leads to a wax soluble network and wherein said low molecular weight polymer is defined by

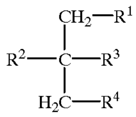

wherein:

$R^1$, $R^2$, $R^3$ and $R^4$ independently represent hydrogen, alkyl of 1–5 carbons, subsituted alkyl of 1–5 carbons, aryl of 6, 10 or 14 carbons or substitued aryl of 6, 10, or 14 carbons with the proviso that at least two of $R^1$, $R^2$, $R^3$ and $R_4$ are independently chosen from the groups consisting of —$(OCH_2CH_2)_aH$; —$(OCH_2CH_2CH_2)_bH$; —$(OCHCH_3CH_2)_cH$; —$(OCH_2CH_2)_d(OCH_2CH_2CH_2)_eH$; —$(OCH_2CH_2)_f(OCHCH_3CH_2)_gH$; —$OCO(CH_2)_hCH_3$; and —$O(CH_2)_jCH_3$;

a, b, c, d, e, f, and g independently represent the integers 1–40; and h and j independently represent the integers 1–20.

15. The recording medium of claim 14 wherein a, b, c, d, e, f, and g independently represent the integers 1–20.

16. The recording medium of claim 15 wherein a, b, c, d, e, f, and g independently represent the integers 1–5.

17. The recording medium of claim 14 wherein h and j independently represent the integers 14–18.

18. The recording medium of claim 1 wherein said first blooming crosslinker or said second blooming crosslinker is chosen from a group consisting of peptide coupler, aziridene and epoxides.

19. A recording medium for recording with a phase change ink comprising:

a substrate;

a support layer coated on said substrate at a coating weight of at least 0.5 mg/$dm^2$ to no more than 10 mg/$dm^2$ wherein said support layer comprises a binder; an adhesive layer coated on said support layer at a coating weight of no more than 10 mg/$dm^2$; and a first blooming crosslinker crosslinking said support layer to said adhesive layer and said adhesive layer is soluble in said phase change ink wherein said support layer further comprises at least at least 2 mole % of a second blooming crosslinker based on the total weight of said second blooming crosslinker and said binder and wherein said first blooming crosslinker or said second blooming crosslinker is defined by $R^5$—HC=CH—$R^6$ wherein:

$R^5$ represents aryl or $COOR^7$;

$R^6$ represents hydrogen, aryl or pyridinium; and $R_7$ represents polyvinyl alcohol, polyalkylene oxides and acrylates.

20. The recording medium of claim 19 wherein said first blooming crosslinker or said second blooming crosslinker is chosen from a group consisting of:

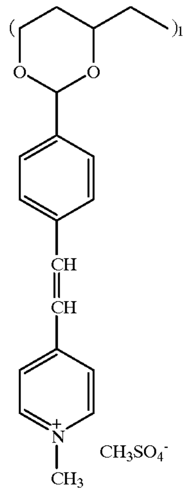

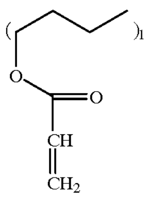

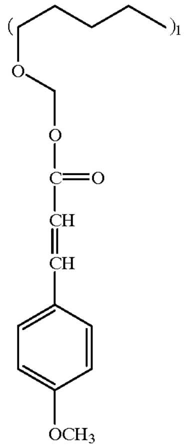

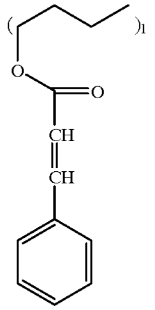

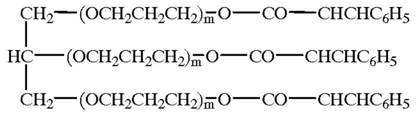

$m$ = 1–20

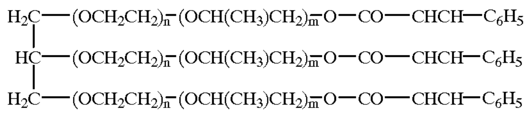

$m$ = 1–20; $n$ = 0–20

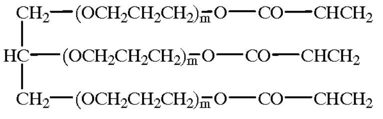

$m$ = 1–20

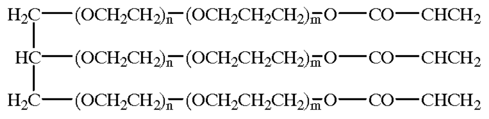

$n, m$ = 1–20

-continued
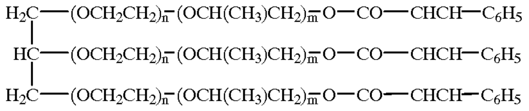
$m$ = 1–20; $n$ = 0–20
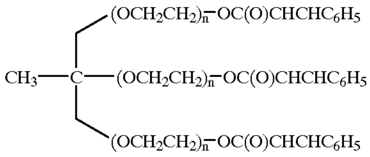
$n$ is 1–40
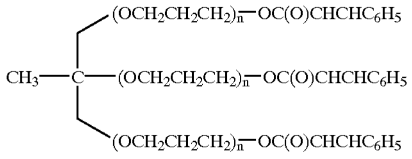
$n$ is 1–40
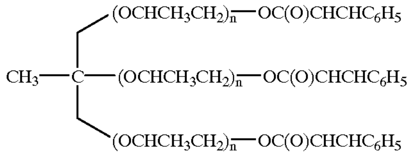
$n$ is 1–40
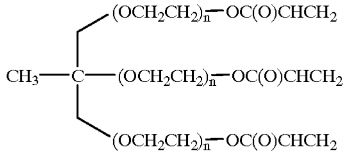
$n$ is 1–40
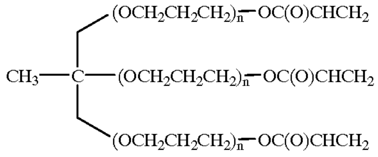
$n$ is 1–40
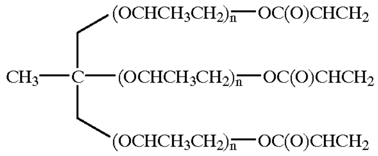
$n$ is 1–40
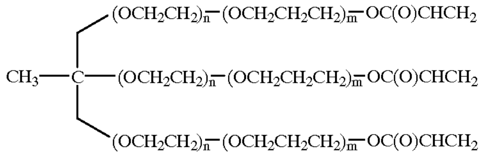
$n$ is 1–40
$m$ is 1–40
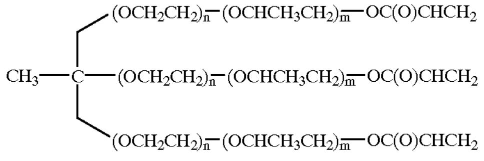
$n$ is 1–40
$m$ is 1–40
-continued
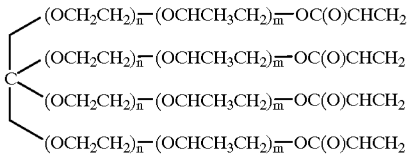
$n$ is 1–40
$m$ is 1–40
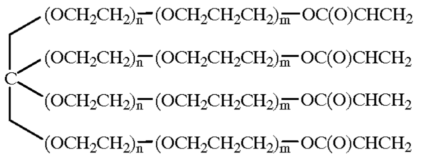
$n$ is 1–40
$m$ is 1–40
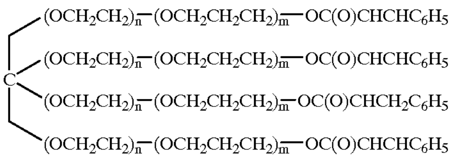
$n$ is 1–40
$m$ is 1–40
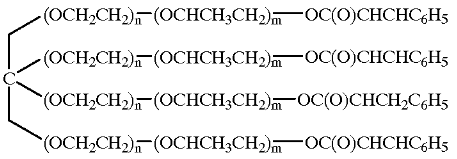
$n$ is 1–40
$m$ is 1–40
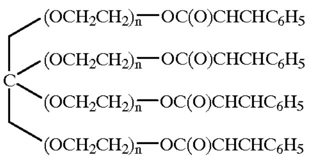
$n$ is 1–40
and
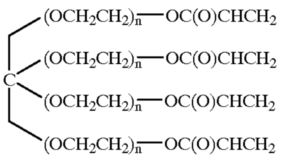
$n$ is 1–40
21. The recording medium of claim 20 wherein said first blooming crosslinker or said second blooming crosslinker is chosen from a group consisting of:
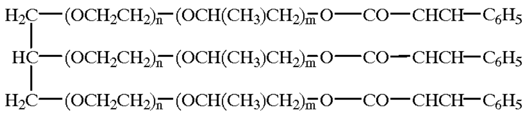
$m$ = 1–20; $n$ = 0–20
and -continued

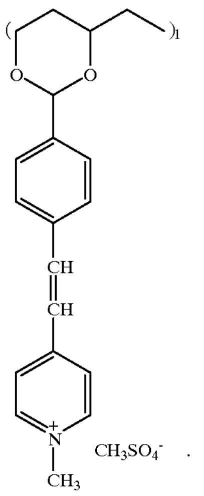

22. A recording medium for recording with a phase change ink comprising:

a substrate;

a support layer coated on said substrate at a coating weight of at least 0.5 mg/dm2 to no more than 10 mg/dm2 wherein said support layer comprises a binder;

an adhesive layer coated on said support layer at a coating weight of no more than 10 mg/dm2; and a first blooming crosslinker crosslinking said support layer to said adhesive layer and said adhesive layer is soluble in said phase change ink wherein said adhesive layer is coated at a coating weight of at least 0.5 mg/dm2.

23. The recording medium of claim 22 wherein said adhesive layer is coated at a coating weight of no more than 8 $mg/dm^2$.

24. A recording medium for recording with a phase change ink comprising:

a substrate;

a support layer coated on said substrate at a coating weight of at least 0.5 $mg/dm^2$ to no more than 10 $mg/dm^2$ wherein said support layer comprises a second blooming crosslinker and a binder;

wherein said binder comprises at least one compound chosen from a group consisting of polyvinyl alcohol, polyacrylamide, polyvinyl pyrrolidone, polyurethane and gelatin;

an adhesive layer coated on said support layer at a coating weight of no more than 10 $mg/dm^2$ wherein said adhesive layer comprises a first blooming crosslinker, and a low molecular weight polymer that leads to a wax soluble network; and wherein said second blooming crosslinker crosslinks said support layer to said adhesive layer and said first blooming crosslinker crosslinks said adhesive layer to said phase change ink.

25. The recording medium of claim 24 wherein said first blooming crosslinker or said second blooming crosslinker is defined by $$R^5—HC{=}CH—R^6$$

wherein:

$R_5$ represents aryl or $COOR^7$;

$R^6$ represents hydrogen, aryl or pyridinium; and $R^7$ represents polyvinyl alcohol, polyalkylene oxides and acrylates.

* * * * *